US008387113B2

(12) United States Patent
Shimada et al.

(10) Patent No.: US 8,387,113 B2
(45) Date of Patent: Feb. 26, 2013

(54) COMMUNICATION SYSTEM, AUTHENTICATION METHOD, INFORMATION PROCESSING DEVICE, INFORMATION PROCESSING METHOD, AND BATTERY

(75) Inventors: Hidetoshi Shimada, Kanagawa (JP); Norio Fujimori, Tokyo (JP); Keiichi Komaki, Tokyo (JP); Keisuke Koide, Tokyo (JP); Tsuyoshi Ookubo, Nagano (JP); Kenichiro Kamijo, Nagano (JP); Daiki Yokoyama, Nagano (JP); Kenichi Takahira, Tokyo (JP); Katsuhisa Tatsukawa, Tokyo (JP)

(73) Assignees: Sony Corporation, Tokyo (JP); Renesas Technology Corp., Tokyo (JP)

( * ) Notice: Subject to any disclaimer, the term of this patent is extended or adjusted under 35 U.S.C. 154(b) by 505 days.

(21) Appl. No.: 12/298,774

(22) PCT Filed: May 10, 2007

(86) PCT No.: PCT/JP2007/060088
§ 371 (c)(1),
(2), (4) Date: Oct. 28, 2008

(87) PCT Pub. No.: WO2007/132908
PCT Pub. Date: Nov. 22, 2007

(65) Prior Publication Data
US 2009/0125979 A1    May 14, 2009

(30) Foreign Application Priority Data

May 15, 2006    (JP) .................................. 2006-135764

(51) Int. Cl.
*G06F 7/04* (2006.01)
(52) U.S. Cl. .............. 726/3; 713/168; 726/36; 320/120; 320/106
(58) Field of Classification Search ..................... 726/3
See application file for complete search history.

(56) References Cited

U.S. PATENT DOCUMENTS

| 2003/0101378 | A1  |  5/2003 | Ohkubo |
| 2003/0218066 | A1* | 11/2003 | Fernandes et al. ............ 235/449 |
| 2004/0128540 | A1* |  7/2004 | Roskind ........................ 713/201 |
| 2005/0001589 | A1* |  1/2005 | Edington et al. .............. 320/128 |
| 2005/0050328 | A1* |  3/2005 | Mizrah .......................... 713/171 |
| 2005/0057216 | A1  |  3/2005 | Yamaguchi et al. |
| 2006/0119315 | A1* |  6/2006 | Sasaki et al. .................. 320/106 |
| 2007/0143864 | A1* |  6/2007 | Cabana et al. ................. 726/36 |

(Continued)

FOREIGN PATENT DOCUMENTS

| EP | 1 018 713 A1 | 7/2000 |
| EP | 1 569 381 A1 | 8/2005 |

(Continued)

*Primary Examiner* — Carl Colin
*Assistant Examiner* — S. Ali Zaidi
(74) *Attorney, Agent, or Firm* — Oblon, Spivak, McClelland, Maier & Neustadt, L.L.P.

(57) ABSTRACT

An authenticating system according to the present invention has a characteristic structure of which an authenticating section 32 of a note type PC 10 and an authenticating section 42 of a battery 20 are directly connected through I/O ports 51 and 61, respectively. Thus, the authenticating system according to the present invention can be relatively easily accomplished using a conventional system. The present invention can be applied to a system that is composed of a plurality of electronic devices that perform an authenticating process.

11 Claims, 5 Drawing Sheets

U.S. PATENT DOCUMENTS

2007/0192599 A1* 8/2007 Kato et al. .................. 713/168
2007/0226497 A1* 9/2007 Taylor ........................ 713/168

FOREIGN PATENT DOCUMENTS

| | | |
|---|---|---|
| JP | 10 171559 | 6/1998 |
| JP | 2000 200222 | 7/2000 |
| JP | 2000-200222 | 7/2000 |
| JP | 2003-162986 | 6/2003 |
| JP | 2003 162986 | 6/2003 |
| JP | 2004 147408 | 5/2004 |
| JP | 2004 310387 | 11/2004 |
| JP | 2005 93109 | 4/2005 |
| JP | 2005 321983 | 11/2005 |
| JP | 2006 114423 | 4/2006 |
| JP | 2006 185782 | 7/2006 |
| WO | WO 2004/040886 A1 | 5/2004 |
| WO | WO 2007/013298 A1 | 2/2007 |

* cited by examiner

COMMUNICATION SYSTEM, AUTHENTICATION METHOD, INFORMATION PROCESSING DEVICE, INFORMATION PROCESSING METHOD, AND BATTERY

TECHNICAL FIELD

The present invention relates to a communication system and an authenticating method; an information processing apparatus and an information processing method; and a battery and an authenticating method, for example, a communication system and an authenticating method; an information processing apparatus and an information processing method; and a battery and an authenticating method suitably used to perform an authenticating process between a battery and an electronic device that uses the battery as a power supply.

BACKGROUND ART

Many portable electronic devices, for example, a note type personal computer, a PDA (Personal Digital Assistant), a portable telephone, a digital still camera, a digital video camera, and a music player use a rechargeable battery pack (hereinafter simply referred to as a battery) as a power supply.

If a battery attached to such a portable electronic device has a defect, there may be a problem such that the portable electronic device cannot fully function with its designed performance. Thus, it is preferred that the use of such a battery be restricted. A battery that has a defect denotes that it is defective or it is a counterfeit.

Although there is a battery that has a built-in memory that stores information about the user, if an illegal charger is used, it is supposed that such information is illegally read therefrom. Thus, it is preferred that the use of an unauthorized charger, namely an illegal charger, be restricted.

As methods of suppressing the use of a battery having a defect or an illegal charger, a method of which a battery having a defect is not recharged (for example, refer to Japanese Patent Application Laid-Open No. 2005-321983), a method of which an illegal charger is detected on a battery side (for example, refer to Japanese Patent Application Laid-Open No. 2004-310387), and a method of which an authenticating process is performed between a battery and a portable electronic device or a charger have been proposed.

There are batteries that detect their states such as current, voltage, and temperature, calculate their remaining capacity based on the detected results, control charging and discharging based on the calculated remaining capacity, and inform the electronic device side of these information.

FIG. 1 shows an exemplary structure especially of a connected portion of a note type personal computer (hereinafter, referred to as a note type PC) and a battery that is a power supply of the note type PC and that can inform the note type PC of the foregoing information about the battery.

The note type PC 10 not only uses the battery 20 as a power supply, but receives power from a power line (not shown) and functions as a charger for the battery 20.

A controlling MCU (Micro Control Unit) 11 is disposed on a substrate of the note type PC 10. The controlling MCU 11 has a built-in memory 12 that stores a control program and a built-in I/O port 13. By executing the control program, a charging controlling section 14, a battery state checking section 15, and a display controlling section 16 are accomplished as functional blocks.

The charging controlling section 14 controls a charging process for the battery 20 that is attached to the note type PC 10. The battery state checking section 15 obtains information (eg, current, voltage, temperature, remaining capacity) that represents the state detected from the battery 20. The display controlling section 16 controls indications for the user such as remaining capacity of the battery 20 based on the obtained information that represents the state of the battery 20.

A controlling MCU 21 is disposed on a substrate of the battery 20. The controlling MCU 21 has a built-in memory 22 that stores a control program and a built-in I/O port 23. By executing the control program, a charging/discharging controlling section 24 and a battery state detecting section 25 are accomplished as functional blocks.

The charging/discharging controlling section 24 controls charging and discharging of the battery 20. The battery state detecting section 25 detects the state (eg, current, voltage, temperature, remaining capacity) of the battery 20.

To cause the exemplary structure shown in FIG. 1 to execute an authenticating process of suppressing the use of a battery having a defect and preventing a normal battery from being attached to an illegal note type PC, there are a software extending method and a hardware extending method.

Specifically, the software extending method is a method of adding an authenticating process to the control program of the controlling MCU 11 and the control program of the controlling MCU 21.

If the software extending method is used, authentication information is communicated between I/O ports 13 and 23 that are existing communication paths. Thus, it is likely that communication throughput between the I/O ports 13 and 23 decreases and that authentication information is read from the I/O ports 13 and 23 that are general purpose ports. In addition to an increase of the control program, there is another problem of which the loads applied on the control MCUs 11 and 21 increase.

On the other hand, the hardware extending method is, for example, as shown in FIG. 2, a method of disposing an authenticating section 32 on the substrate of the note type PC 10, connecting the authenticating section 32 and the controlling MCU 11, disposing an authenticating section 42 in the battery 20, and connecting the authenticating section 42 and the controlling MCU 21. More specifically, the hardware extending method is a method of connecting an I/O port 31 added to the controlling MCU 11 and an I/O port 33 built in the authenticating section 32, connecting an I/O port 41 added to the controlling MCU 21 and an I/O port 43 built in the authenticating section 42, and communicating authentication information between the authenticating section 32 and the authenticating section 42 through the I/O ports 33, 31, 13, 23, 41, and 43.

Next, with reference to a flow chart shown in FIG. 3, the authenticating process of the system shown in FIG. 2 will be described. In addition, in the following description, it is assumed that the master of the authenticating process and the slave of the authentication process are assigned to the note type PC 10 and the battery 20, respectively. Instead, the roles of the master and slave may be reversed.

The authenticating process is triggered, for example, when the battery 20 is attached to the note type PC 10, when the power of the note type PC 10 to which the battery 20 has been attached is turned on or off, or when the operation, for example, of a predetermined button is detected.

At step S1, the controlling MCU 11 of the note type PC 10 outputs an authentication start command to the controlling MCU 21 of the battery 20. At step S2, corresponding to the command, the controlling MCU 21 outputs a resume (startup) command to the authenticating section 42 that is in a standby state for power saving. Corresponding to this command, the authenticating section 42 resumes (starts up).

At step S3, the controlling MCU 11 outputs a resume (startup) command to the authenticating section 32 that is in a standby state for power saving. Corresponding to this command, the authenticating section 32 resumes (starts up). At step S4, the controlling MCU 11 outputs an authentication start command to the authenticating section 32 that has resumed (started up).

At step S5, corresponding to this command, the authenticating section 32 outputs first question information against the authenticating section 42 of the battery 20 to the controlling MCU 11 through the I/O port 33. At step S6, the controlling MCU 11 outputs the first question information that has been input through the I/O port 31 to the controlling MCU 21 of the battery 20 through the I/O port 13. At step S7, the controlling MCU 21 outputs the first question information that has been input through the I/O port 23 to the authenticating section 42 through the I/O port 41.

At step S8, the authenticating section 42 generates first response information against the first question information that has been input through the I/O port 43 and outputs the generated first response information to the controlling MCU 21 through the I/O port 43. At step S9, the controlling MCU 21 outputs the first response information that has been input through the I/O port 41 to the controlling MCU 11 of the note type PC 10 through the I/O port 23. At step S10, the controlling MCU 11 outputs the first response information that has been input through the I/O port 13 to the authenticating section 32 through the I/O port 31.

In addition, when the question information and the response information are relayed, if necessary, in the controlling MCUs 11 and 21, data formats of these information are converted for the individual I/O ports.

Thereafter, the same processes as steps S5 to S10 are repeated a predetermined number of time, N−1. As the processes from steps S11 to S16, N-th question information is transmitted from the authenticating section 32. N-th response information corresponding to the N-th question information is returned to the authenticating section 32. The authenticating section 32 determines whether or not the battery 20 is an authorized battery based on the first to N-th response information.

At step S17, the controlling MCU 21 that has output the N-th response information to the controlling MCU 11 of the note type PC 10 as the process at step S15 outputs a standby command to the authenticating section 42. Corresponding to this command, the authenticating section 42 becomes the standby state again.

At step S18, the authenticating section 32 of the note type PC 10 outputs an authenticated result that denotes whether the battery 20 is an authorized battery or an unauthorized battery or whether or not a communication error has occurred to the controlling MCU 11. Based on the authenticated result, the controlling MCU 11 causes the charging controlling section 14 to stop the charging process or the display controlling section 16 to inform the user that the battery 20 is for example a defective battery.

Thereafter, at step S19, the controlling MCU 11 outputs the standby command to the authenticating section 32. Corresponding to this command, the authenticating section 32 becomes the standby state again. Now, the authenticating process is complete.

As described above, if the hardware extending method is used, like the case that the software extending method is used, authentication information is communicated between the I/O ports 13 and 23 that are existing communication paths. Thus, communication throughput decreases between the I/O ports 13 and 23. In addition, it is likely that authentication information is read from the I/O ports 13 and 23 that are general purpose ports.

In addition, since the communication path for authentication information (question information and response information) is lengthened, the communication time is proportionally prolonged. In addition, whenever authentication information is relayed, the format of the data needs to be converted for each I/O port. Thus, the loads applied on the controlling MCUs 11 and 21 increase.

Since a controlling MCU for a portable electronic device and a controlling MCU for a battery normally do not have affordable processing capacity due to cost reduction, it is recommended that the controlling MCUs be more simplified and load applied thereon be reduced.

DISCLOSURE OF THE INVENTION

The present invention has been made from the foregoing point of view and is to reduce the loads applied for authenticating processes that both master-side and slave-side controlling MCUs perform.

A communication system of a first aspect of the present invention is in a communication system which communicates predetermined data between a first electronic device and a second electronic device, the first electronic device, including: first communicating means for connecting the first electronic device with the second electronic device and communicating the predetermined data with the second electronic device; second communicating means for connecting the first electronic device with the second electronic device and communicating authentication data for an authenticating process with the second electronic device, the second communicating means being different from the first communicating means; first controlling means for controlling communication for the predetermined data with the second electronic device through the first communicating means; and first authenticating means for performing the authenticating process with the second electronic device through the second communicating means, and the second electronic device, including: first connecting means for connecting the second electronic device with the first communicating means and communicating the predetermined data with the first communicating means; second connecting means for connecting the second electronic device with the second communicating means and communicating authentication data for the authenticating process with the second communicating means, the authentication data being different from the data communicated by the first connecting means; second controlling means for controlling communication for the predetermined data with the first electronic device through the first connecting means; and second authenticating means for performing the authenticating process with the first electronic device through the second connecting means.

A communication system of the first aspect of the present invention is the communication system wherein the first electronic device further comprises: third communicating means for connecting the first controlling means and the first authenticating means, wherein when the first controlling means has informed the second electronic device of an authentication start command through the first communicating means, the first controlling means informs the first authenticating means of the authentication start command through the third communicating means, wherein the second electronic device further comprises: third connecting means for connecting the second controlling means and the second authenticating means, and wherein when the second controlling means has received the authentication start command from the first electronic device through the first communicating means, the second controlling means informs the second authenticating means of the authentication start command through the third connecting means.

An authenticating method of a second aspect of the present invention is in an authenticating method of a communication system which communicates predetermined data between a first electronic device and a second electronic device, the first electronic device, including: first communicating means for connecting the first electronic device with the second electronic device and communicating the predetermined data with the second electronic device; second communicating means for connecting the first electronic device with the second electronic device and communicating authentication data for an authenticating process with the second electronic device, the second communicating means being different from the first communicating means; first controlling means for controlling communication for the predetermined data with the second electronic device through the first communicating means; and first authenticating means for performing the authenticating process with the second electronic device through the second communicating means, and the second electronic device, including: first connecting means for connecting the second electronic device with the first communicating means and communicating the predetermined data with the first communicating means; second connecting means for connecting the second electronic device with the second communicating means and communicating authentication data for the authenticating process with the second communicating means, the authentication data being different from the data communicated by the first connecting means; second controlling means for controlling communication for the predetermined data with the first electronic device through the first connecting means; and second authenticating means for performing the authenticating process with the first electronic device through the second connecting means, the authenticating method, including the steps of: causing the first authenticating means to transmit the authentication data to the second authenticating means through the second communicating means and the second connecting means, not through the first and second controlling means; causing the second authenticating means to reply authentication data in response to the received authentication data to the first authenticating means through the second connecting means and the second communicating means, not through the first and second controlling means; and causing the first authenticating means to determine whether or not the second electronic device is an authorized one based on the replied authentication data.

In the first aspect of the present invention, by the first authenticating means, authentication data is transmitted to the second authenticating means through the second communicating means and the second connecting means, not through the first and second controlling means. By the second authenticating means, authentication data in response to received authentication data is returned to the first authenticating means through the second connecting means and the second communicating means, not through the first and second controlling means. By the first authenticating means, it is determined whether or not the second electronic device is an authorized one based on the returned authentication data.

An information processing apparatus of a second aspect of the present invention is in an information processing apparatus which communicates predetermined data with an electronic device attached thereto, the information processing apparatus including: first connecting means for connecting the information processing apparatus with the electronic device and communicating the predetermined data with the electronic device; second connecting means for connecting the information processing apparatus with the electronic device and communicating authentication data for an authenticating process with the electronic device, the authentication data being different from the data communicated by the first connecting means; controlling means for controlling communication for the predetermined data with the electronic device through the first connecting means; and authenticating means for performing the authenticating process with the electronic device through the second connecting means.

The information processing apparatus of the second aspect of the present invention can further comprise third communicating means for connecting the controlling means and the authenticating means. The controlling means informs the electronic device of an authentication start command through the first connecting means and informs the authenticating means of the authentication start command through the third communicating means.

The information processing apparatus of the second aspect of the present invention can further comprise third communicating means for connecting the controlling means and the authenticating means. The controlling means receives an authenticated result from the authenticating means through the third communicating means and, after the authenticating means has completed the authenticating process, informs the electronic device that the authenticating process has been complete.

An information processing method of the second aspect of the present invention is in an information processing method for an information processing apparatus including: first connecting means for connecting the information processing apparatus with an electronic device attached thereto and communicating predetermined data with the electronic device; second connecting means for connecting the information processing apparatus with the electronic device and communicating authentication data for an authenticating process with the electronic device, the authentication data being different from the data communicated by the first connecting means; controlling means for controlling communication for the predetermined data with the electronic device through the first connecting means; and authenticating means for performing the authenticating process with the electronic device through the second connecting means, the information processing method, including the steps of: causing the authenticating means to transmit the authentication data to the electronic device through the second connecting means, not through the controlling means; causing the authenticating means to receive authentication data replied from the electronic device in response to the transmitted authentication data through the second connecting means, not through the controlling means; and causing the authenticating means to determine whether or not the electronic device is an authorized one based on the received authentication data.

In the second aspect of the present invention, by the authenticating means, authentication data are transmitted to the electronic device through the second connecting means, not through the controlling means; by the authenticating means, authentication data replied from the electronic device in response to the transmitted authentication data is received through the second connecting means, not through the controlling means; by the authenticating means, it is determined whether or not the electronic device is an authorized one based on the received authorization data.

A battery of a third aspect of the present invention is in a battery which performs an authenticating process with an electronic device attached thereto, the battery, including: first connecting means for connecting the battery with the electronic device and communicating predetermined data with the electronic device; second connecting means for connecting the battery with the electronic device and communicating authentication data for the authenticating process with the electronic device, the authentication data being different from the data communicated by the first connecting means; controlling means for controlling communication for the predetermined data with the electronic device through the first connecting means; and authenticating means for performing the authenticating process with the electronic device through the second connecting means.

The battery of the third aspect of the present invention can further comprise: third connecting means for connecting the controlling means and the authenticating means. The controlling means receives an authentication start command from the electronic device through the first connecting means and informs the authenticating means of the authentication start command through the third connecting means.

The controlling means can include: detecting means for detecting at least one of current, voltage, temperature, and remaining capacity of the battery. The controlling means controls communication for a detected result of the detecting means with the electronic device through the first connecting means.

In the third aspect of the present invention, by the authenticating means, authentication data are transmitted to the electronic device through the second connecting means, not through the controlling means; by the authenticating means, authentication data replied from the electronic device in response to the transmitted authentication data are received through the second connecting means, not through the controlling means; by the authenticating means, it is determined whether or not the electronic device is an authorized one based on the received authentication data.

According to the first aspect of the present invention, the loads of the master-side and slave-side controlling MCUs that perform authenticating processes can be reduced.

According to the second aspect of the present invention, the load of the master-side controlling MCU that performs authenticating process can be reduced.

According to the third aspect of the present invention, the load of the controlling MCU of the battery that performs authenticating process with the electronic device can be reduced.

BEST MODES FOR CARRYING OUT THE INVENTION

Figure 1:
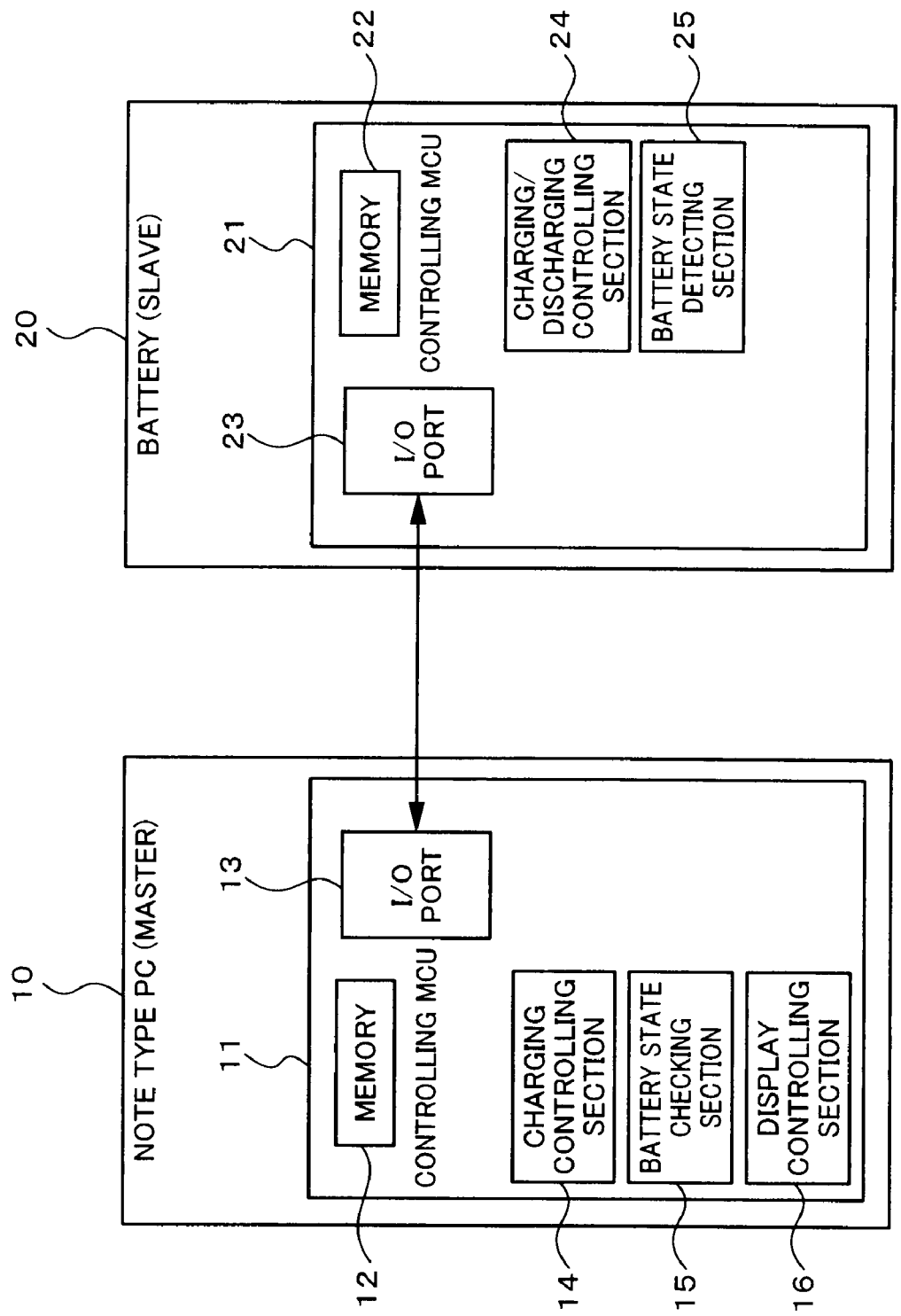
FIG. 1 is a block diagram showing an exemplary structure of a system composed of a note type PC and a battery.

Next, embodiments of the present invention will be described. The relationship between essential components of the invention and embodiments described in the specification or drawings is as follows, for example. This relationship denotes that the embodiments that support the invention are described in the specification or drawings. Thus, although some embodiments are described in the specification or drawings, even if they are not described here as those corresponding to the essential components of the invention, it is not implied that they do not correspond to the essential components of the invention. Conversely, even if they are described here as those corresponding to essential components of the invention, it is not implied that the embodiments do not correspond to other than the essential components of the invention.

A communication system as set forth in claim 1 is in a communication system which communicates predetermined data between a first electronic device (eg, a note type PC 10 shown in FIG. 4) and a second electronic device (eg, a battery 20 shown in FIG. 4), the first electronic device, including first communicating means (eg, an I/O port 13 shown in FIG. 4) for connecting the first electronic device with the second electronic device and communicating the predetermined data with the second electronic device; second communicating means (eg, an I/O port 51 shown in FIG. 4) for connecting the first electronic device with the second electronic device and communicating authentication data for an authenticating process with the second electronic device, the second communicating means being different from the first communicating means; first controlling means (eg, a controlling MCU 11 shown in FIG. 4) for controlling communication for the predetermined data with the second electronic device through the first communicating means; and first authenticating means (eg, an authenticating section 32 shown in FIG. 4) for performing the authenticating process with the second electronic device through the second communicating means, and the second electronic device, including first connecting means (eg, an I/O port 23 shown in FIG. 4) for connecting the second electronic device with the first communicating means and communicating the predetermined data with the first communicating means; second connecting means (eg, an I/O port 61 shown in FIG. 4) for connecting the second electronic device with the second communicating means and communicating authentication data for the authenticating process with the second communicating means, the authentication data being different from the data communicated by the first connecting means; second controlling means (eg, a controlling MCU 21 shown in FIG. 4) for controlling communication for the predetermined data with the first electronic device through the first connecting means; and second authenticating means (eg, an authenticating section 42 shown in FIG. 4) for performing the authenticating process with the first electronic device through the second connecting means.

A communication system as set forth in claim 2 is the communication system wherein the first electronic device further comprises third communicating means (eg, I/O ports 31, 33 shown in FIG. 4) for connecting the first controlling means and the first authenticating means and the second electronic device further comprises third connecting means (eg, I/O ports 41, 43 shown in FIG. 4) for connecting the second controlling means and the second authenticating means.

Figure 4:
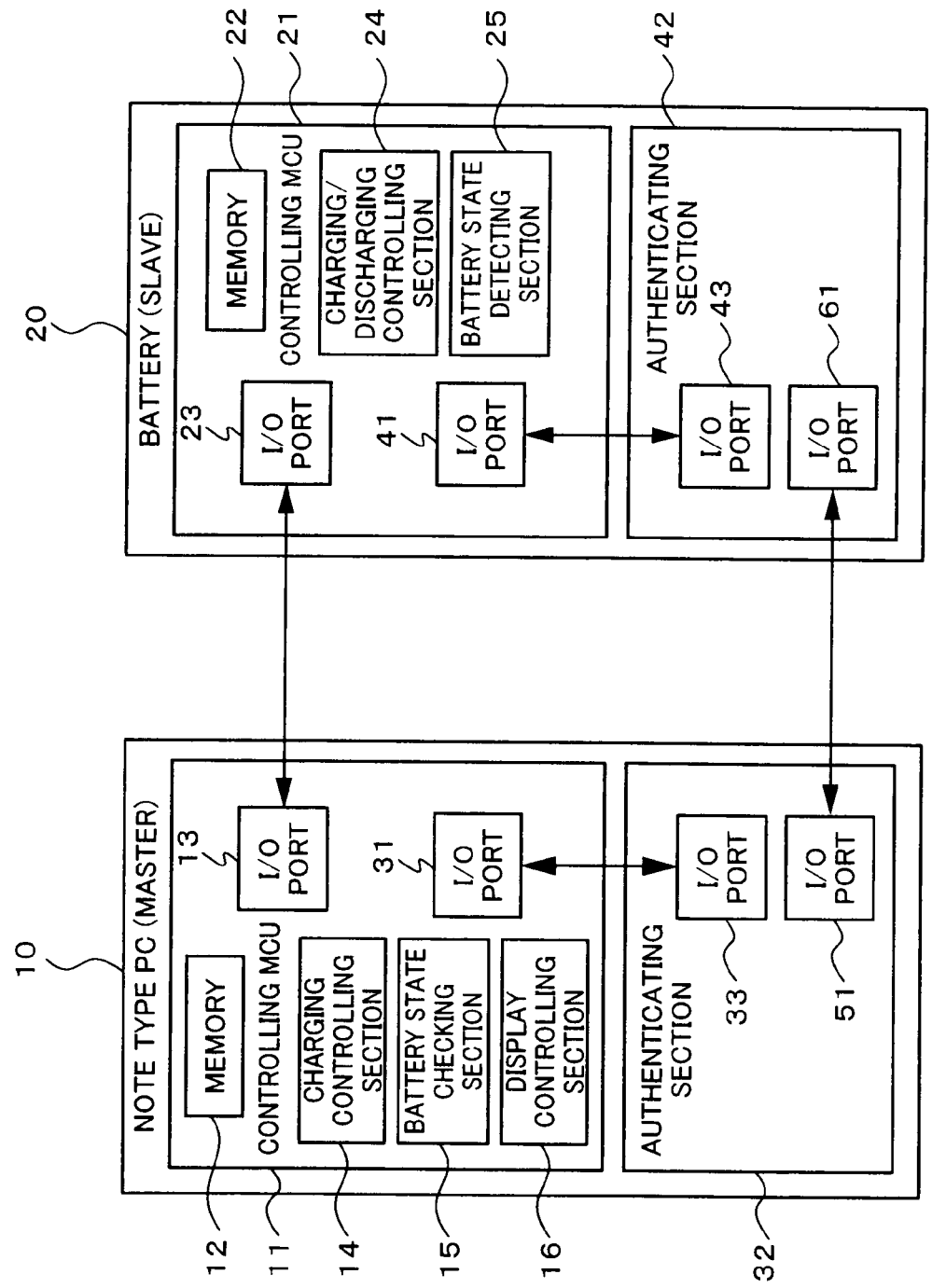
FIG. 4 is a block diagram showing an exemplary structure of an authenticating system according to the present invention.
Figure 5:
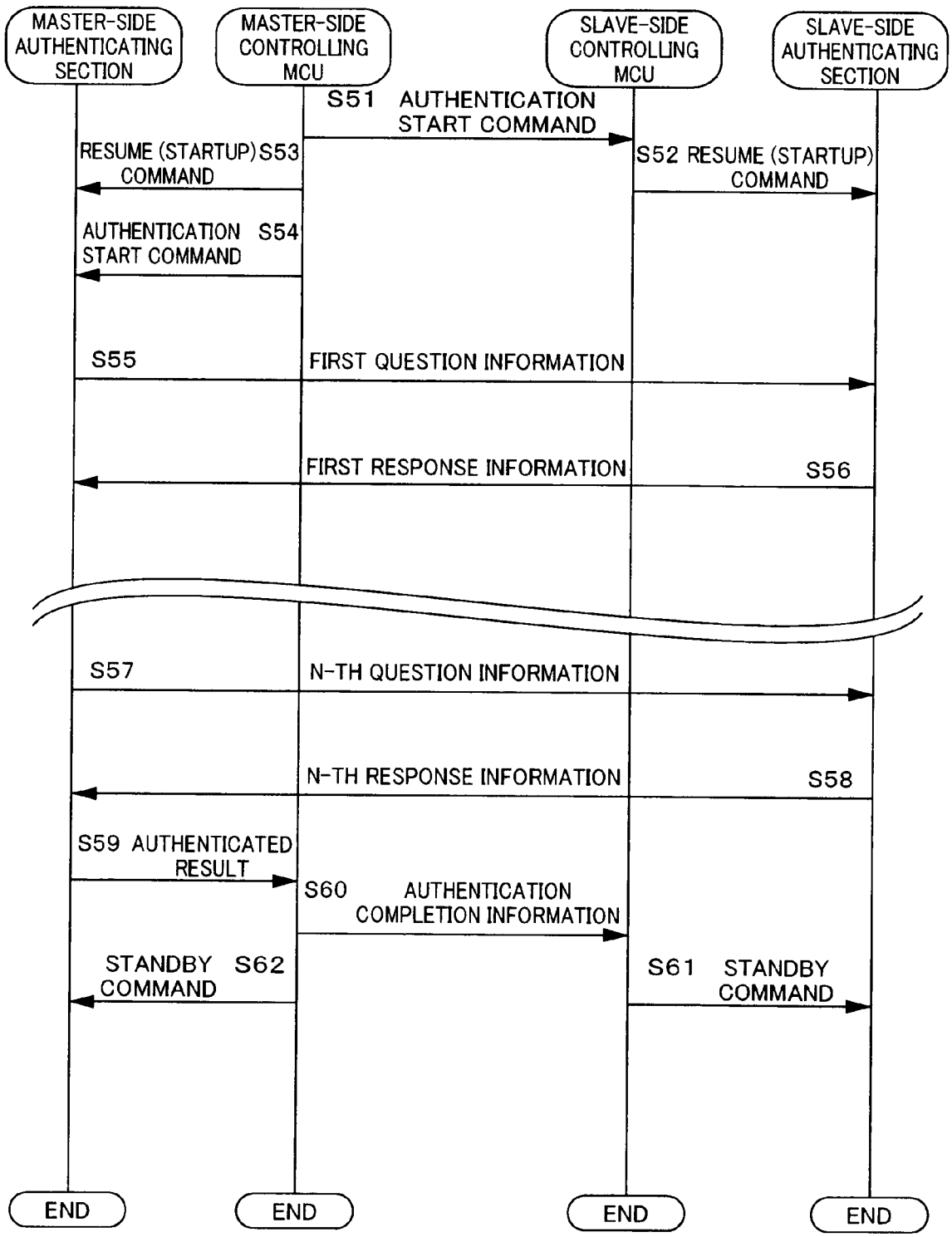
FIG. 5 is a flow chart describing an authenticating process of the system shown in FIG. 4.

An authenticating method as set forth in claim 3 is in an authenticating method of a communication system which communicates predetermined data between a first electronic device and a second electronic device, the first electronic device, including first communicating means (eg, an I/O port 13 shown in FIG. 4) for connecting the first electronic device with the second electronic device and communicating the predetermined data with the second electronic device; second communicating means (eg, an I/O port 51 shown in FIG. 4) for connecting the first electronic device with the second electronic device and communicating authentication data for an authenticating process with the second electronic device, the second communicating means being different from the first communicating means; first controlling means (eg, a controlling MCU 11 shown in FIG. 4) for controlling communication for the predetermined data with the second electronic device through the first communicating means; and first authenticating means (eg, an authenticating section 32 shown in FIG. 4) for performing the authenticating process with the second electronic device through the second communicating means, and the second electronic device, including first connecting means (eg, an I/O port 23 shown in FIG. 4) for connecting the second electronic device with the first communicating means and communicating the predetermined data with the first communicating means; second connecting means (eg, an I/O port 61 shown in FIG. 4) for connecting the second electronic device with the second communicating means and communicating authentication data for the authenticating process with the second communicating means, the authentication data being different from the data communicated by the first connecting means; second controlling means (eg, a controlling MCU 21 shown in FIG. 4) for controlling communication for the predetermined data with the first electronic device through the first connecting means; and second authenticating means (eg, an authenticating section 42 shown in FIG. 4) for performing the authenticating process with the first electronic device through the second connecting means, the authenticating method, including the steps of causing the first authenticating means to transmit the authentication data to the second authenticating means through the second communicating means and the second connecting means, not through the first and second controlling means (eg, at step S55 shown in FIG. 5); causing the second authenticating means to reply authentication data in response to the received authentication data to the first authenticating means through the second connecting means and the second communicating means, not through the first and second controlling means (eg, at step S56 shown in FIG. 5); and causing the first authenticating means to determine whether or not the second electronic device is an authorized one based on the replied authentication data (eg, at step S59 shown in FIG. 5).

An information processing apparatus as set forth in claim 4 is in an information processing apparatus (eg, a note type PC 10 shown in FIG. 4) which communicates predetermined data with an electronic device (eg, a battery 20 shown in FIG. 4) attached thereto, the information processing apparatus including first connecting means (eg, an I/O port 13 shown in FIG. 4) for connecting the information processing apparatus with the electronic device and communicating the predetermined data with the electronic device; second connecting means (eg, an I/O port 51 shown in FIG. 4) for connecting the information processing apparatus with the electronic device and communicating authentication data for an authenticating process with the electronic device, the authentication data being different from the data communicated by the first connecting means; controlling means (eg, a controlling MCU 11 shown in FIG. 4) for controlling communication for the predetermined data with the electronic device through the first connecting means; and authenticating means (eg, an authenticating section 32 shown in FIG. 4) for performing the authenticating process with the electronic device through the second connecting means.

Information processing apparatus as set forth in claims 5 and 6 further comprise third communicating means (eg, I/O ports 31, 33 shown in FIG. 4) for connecting the controlling means and the authenticating means.

An information processing method as set forth in claim 7 is in an information processing method for an information processing apparatus including first connecting means (eg, an I/O port 13 shown in FIG. 4) for connecting the information processing apparatus with an electronic device (eg, a battery 20 shown in FIG. 4) attached thereto and communicating predetermined data with the electronic device; second connecting means (eg, an I/O port 51 shown in FIG. 4) for connecting the information processing apparatus with the electronic device and communicating authentication data for an authenticating process with the electronic device, the authentication data being different from the data communicated by the first connecting means; controlling means (eg, a controlling MCU 11 shown in FIG. 4) for controlling communication for the predetermined data with the electronic device through the first connecting means; and authenticating means (eg, an authenticating section 32 shown in FIG. 4) for performing the authenticating process with the electronic device through the second connecting means, the information processing method, including the steps of causing the authenticating means to transmit the authentication data to the electronic device through the second connecting means, not through the controlling means (eg, at step S55 shown in FIG. 5); causing the authenticating means to receive authentication data replied from the electronic device in response to the transmitted authentication data through the second connecting means, not through the controlling means (eg, at step S56 shown in FIG. 5); and causing the authenticating means to determine whether or not the electronic device is an authorized one based on the received authentication data (eg, at step S59 shown in FIG. 5).

A battery as set forth in claim 8 is in a battery (eg, a battery 20 shown in FIG. 4) which performs an authenticating process with an electronic device (eg, a note type PC 10 shown in FIG. 4) attached thereto, the battery, including first connecting means (eg, an I/O port 23 shown in FIG. 4) for connecting the battery with the electronic device and communicating predetermined data with the electronic device; second connecting means (eg, an I/O port 61 shown in FIG. 4) for connecting the battery with the electronic device and communicating authentication data for the authenticating process with the electronic device, the authentication data being different from the data communicated by the first connecting means; controlling means (eg, a controlling MCU 21 shown in FIG. 4) for controlling communication for the predetermined data with the electronic device through the first connecting means; and authenticating means (eg, an authenticating section 42 shown in FIG. 4) for performing the authenticating process with the electronic device through the second connecting means.

A battery as set forth in claim 9 is the battery further including third connecting means (eg, I/O ports 41, 43 shown in FIG. 4) for connecting the controlling means and the authenticating means.

The controlling means includes detecting means (eg, a battery state detecting section 25 shown in FIG. 4) for detecting at least one of current, voltage, temperature, and remaining capacity of the battery.

Next, with reference to the accompanying drawings, specific embodiments of the present invention will be described in detail.

FIG. 4 shows an exemplary structure of an authenticating system according to an embodiment of the present invention.

Figure 2:
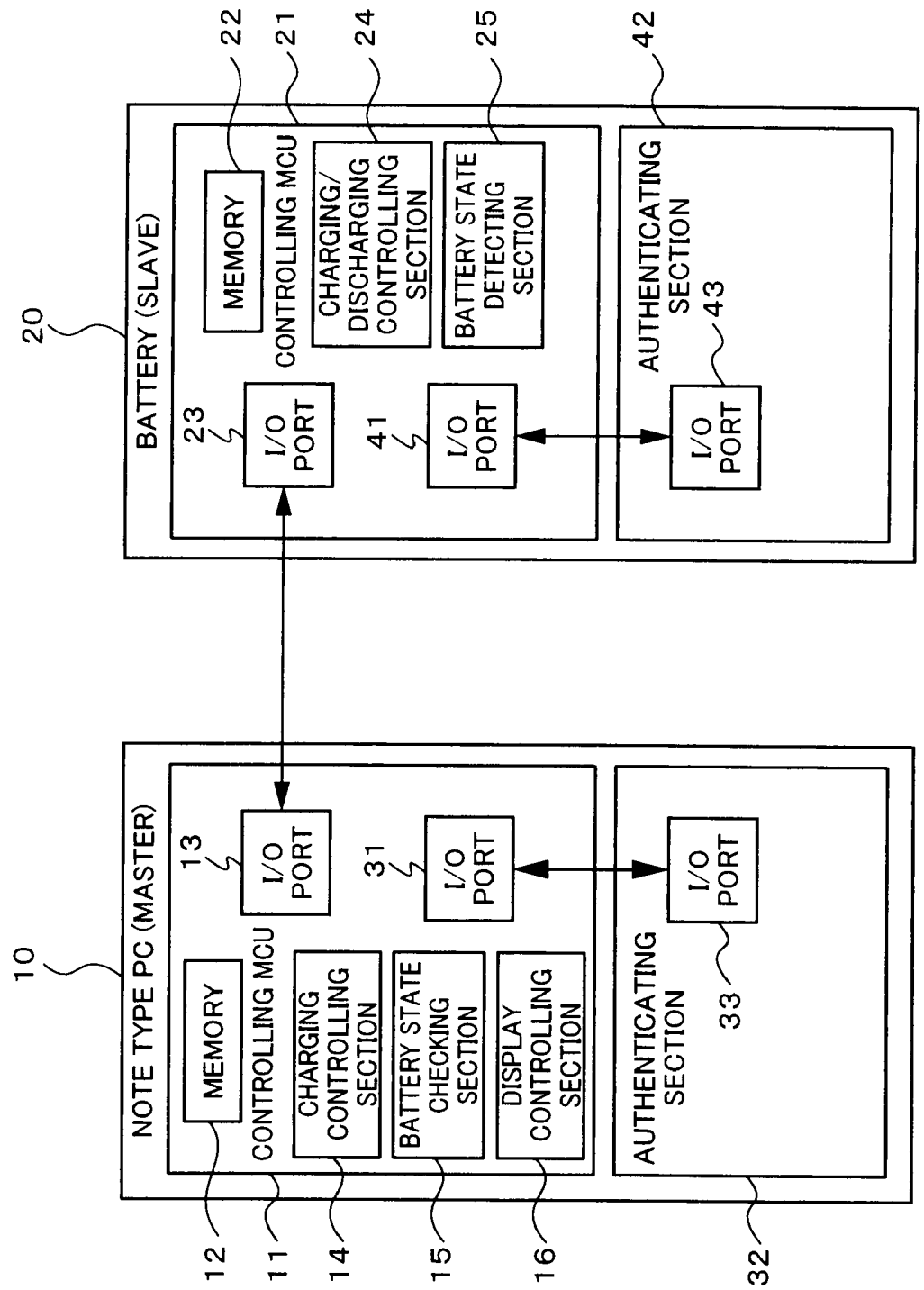
FIG. 2 is a block diagram showing an exemplary structure of which the system shown in FIG. 1 has been hardware extended to perform an authenticating process.
Figure 3:
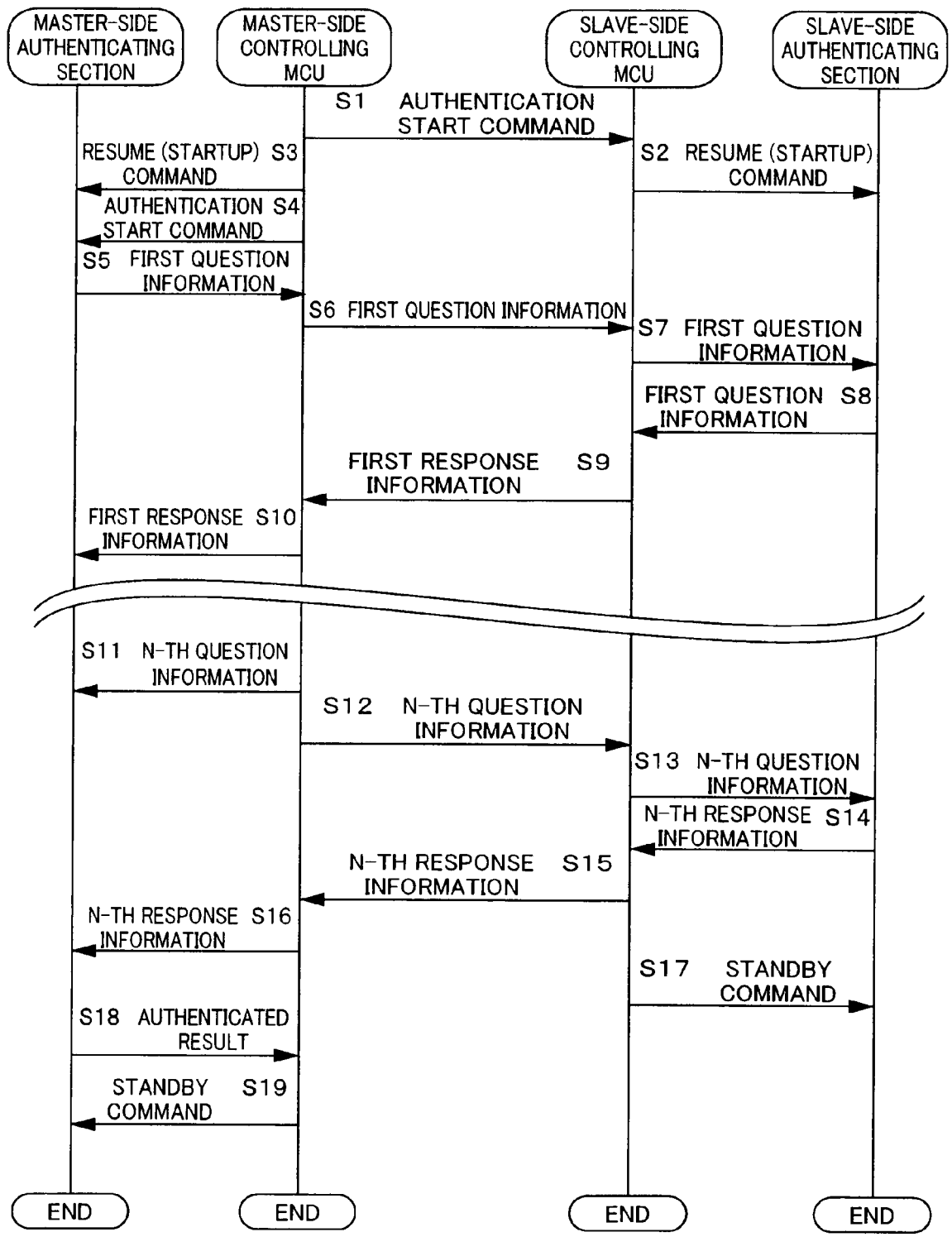
FIG. 3 is a flow chart describing an authenticating process of the system shown in FIG. 2.

Like the structure shown in FIG. 2, this authenticating system is composed of a note type PC 10 and a battery 20 that is a power supply thereof and that can inform the note type PC 10 of information about the battery 20. However, FIG. 4 shows an exemplary structure especially of a mutually connecting section of the system.

The note type PC 10 not only uses the battery 20 as a power supply, but receives power from a power line (not shown) and functions as a charger for the battery 20.

A controlling MCU 11 is disposed on a substrate of the note type PC 10. The controlling MCU 11 has a built-in memory 12 that stores a control program, a built-in I/O port 13, and a built-n I/O port 31. By executing the control program, a charging controlling section 14, a battery state checking section 15, and a display controlling section 16 are accomplished as functional blocks.

The charging controlling section 14 controls a charging process for the battery 20 that is attached. The battery state checking section 15 obtains information (eg, current, voltage, temperature, remaining capacity, etc.) that represents the state of the battery 20 from the battery 20 through the I/O port 13. The display controlling section 16 controls indications such as remaining capacity of the battery 20 of which the user is informed based on the obtained information that represents the state of the battery 20.

An authenticating section 32 that is a hardware module is also disposed on the substrate of the note type PC 10. The authenticating section 32 performs an authenticating process for the battery 20, has built-in I/O ports 33 and 51, and is connected to the I/O port 31 of the controlling MCU 11 through the I/O port 33 and to an I/O port 61 of an authenticating section 42 of the battery 20 through the I/O port 51.

A controlling MCU 21 is disposed on a substrate of the battery 20. The controlling MCU 21 has a built-in memory 22 that stores a control program, a built-in I/O port 23, a built-in I/O port 41. By executing the control program, a charging/discharging controlling section 24 and a battery state detecting section 25 are accomplished as functional blocks.

The charging/discharging controlling section 24 controls charging and discharging of the battery 20. The battery state detecting section 25 detects the state (eg, current, voltage, temperature, remaining capacity) of the battery 20 and supplies information that represents the detected state of the battery 20 to the battery state checking section 15 through the I/O port 13 corresponding to a request from the battery state checking section 15 of the note type PC 10.

The authenticating section 42 that is a hardware module is also disposed on the substrate of the battery 20. The authenticating section 42 performs an authenticating process for the note type PC 10, has built-in I/O ports 43 and 61, and is connected to the I/O port 41 of the controlling MCU 21 through the I/O port 43 and to the I/O port 51 of the authenticating section 32 of the note type PC 10 through the I/O port 61.

As is clear from FIG. 4 and the foregoing description, as a characteristic structure of the authenticating system according to the present invention, the authenticating section 32 of the note type PC 10 and the authenticating section 42 of the battery 20 are directly connected to the conventional system shown in FIG. 2 through the I/O ports 51 and 61. Thus, the authenticating system according to the present invention can be more easily accomplished using the conventional system.

Although between the I/O ports 51 and 61, mainly authentication information is communicated, not dedicated for the authenticating process, information other than authentication information may be exchanged therebetween. Instead, authentication information may be communicated between the I/O ports 13 and 23.

Next, with reference to a flow chart shown in FIG. 5, the operation of the authenticating system according to the present invention will be described. In the following description, it is assumed that the master of the authenticating process and the slave of the authenticating process are assigned to the note type PC 10 and the battery 20, respectively. Instead, it is possible to assign the master and the slave to the battery 20 and the note type PC 10, respectively.

The authenticating process is triggered, for example, when the battery 20 is attached to the note type PC 10, when the power of the note type PC 10 to which the battery 20 has been attached is turned on or off, or when the operation, for example, of a predetermined button is detected.

At step S51, the controlling MCU 11 of the note type PC 10 outputs an authentication start command to the controlling MCU 21 of the battery 20. At step S52, corresponding to the command, the controlling MCU 21 outputs a resume (startup) command to the authenticating section 42 that is in a standby state for power saving. Corresponding to this command, the authenticating section 42 resumes (starts up).

At step S53, the controlling MCU 11 outputs the resume (startup) command to the authenticating section 32 that is in the standby state for power saving through the I/O port 31. Corresponding to this command, the authenticating section 32 resumes (starts up). At step S54, the controlling MCU 11 outputs an authentication start command to the authenticating section 32 that has resumed (started up) through the I/O port 31.

At step S55, corresponding to this command, the authenticating section 32 outputs first question information to the authenticating section 42 of the battery 20 through the I/O port 51. At step S56, corresponding to this, the authenticating section 42 generates first response information corresponding to the input first question information and outputs the generated first response information to the authenticating section 32 of the note type PC 10 through the I/O port 61.

Thereafter, the same processes as those at steps S55 and S56 are repeated a predetermined number of times, N−1. As processes at steps S57 and S58, N-th question information is transmitted from the authenticating section 32 through the I/O port 51 and N-th response information corresponding thereto is replied from the authenticating section 42. The authenticating section 32 determines whether or not the battery 20 is an authorized one based on the first to N-th response information.

At step S59, the authenticating section 32 of the note type PC 10 outputs an authenticated result that denotes that the battery 20 is an authorized one, that the battery 20 is an unauthorized one, or that a communication error has occurred, to the controlling MCU 11 through the I/O port 33. The controlling MCU 11 causes the charging controlling section 14 to stop the charging process or the display controlling section 16 to inform the user that the battery is a defective one based on the authenticated result.

Thereafter, at step S60, the controlling MCU 11 informs the controlling MCU 21 of the battery 20 through the I/O port 13 that the authenticating process has been complete. At step S61, corresponding to this notification, the controlling MCU 21 outputs a standby command to the authenticating section 42 through the I/O port 41. Corresponding to this command, the authenticating section 42 becomes the standby state again.

At step S62, the controlling MCU 11 outputs the standby command to the authenticating section 32 through the I/O port 31. Corresponding to this command, the authenticating section 32 becomes the standby state again. Now, the authenticating process is complete.

As described above, in the authenticating system according to the present invention, authentication information (question information and response information) is communicated between the I/O ports 51 and 61 that are paths mainly used for the authenticating process. Thus, likelihood of which authentication information is read from the general purpose ports, I/O ports 13 and 23, can be removed without a decrease of communication throughput.

In addition, communication path is shortened in comparison with the structure that relays authentication information (question information and response information) through the I/O ports 13 and 23. Moreover, in the controlling MCUs 11 and 21, the data formats of authentication information are not necessary to be converted for the individual I/O ports. Thus, the loads applied on the controlling MCUs 11 and 21 can be more decreased than those of the conventional structure.

In addition, using the paths for the authenticating process, the authenticating processes (namely, from steps S55 to S58) of the authenticating sections 32 and 42 as hardware modules developed and provided by the device maker can be used as they are, not affected by the controlling MCUs 11 and 21. Thus, the authenticating sections can be developed and designated without deteriorating the reliability of authentication.

Instead, a plurality of paths mainly used for the authenticating process may be added. With the plurality of paths, throughput of communication can be maintained or improved. If some of the plurality of paths are randomly selected and authentication information is transmitted through the selected paths, authentication information can be prevented from being leaked out.

It should be noted that the present invention can be applied not only a combination of a note type PC and a battery, but combinations of a battery and any type of electronic device that uses the battery as a power supply. In addition, the present invention can be applied to a system composed of a plurality of electronic devices that are connected and that execute an authenticating process.

In this specification, steps executed based on a program include not only processes executed chronologically according to the described order, but processes executed in parallel or discretely.

Further, in this specification, the system represents a whole apparatus composed of a plurality of apparatus.

In addition, embodiments of the present invention are not limited to those that have been described above. Instead, these embodiments can be modified in various manners without departing from the scope of the present invention.

DESCRIPTION OF REFERENCE NUMERALS

10 Note Type PC
11 Controlling MCU
12 Memory
13 I/O Port
14 Charging Controlling Section
15 Battery State Checking Section
16 Display Controlling Section
20 Battery
21 Controlling MCU
22 Memory
23 I/O Port
24 Charging/Discharging Controlling Section
25 Battery State Detecting Section
31 I/O Port
32 Authenticating Section
33 I/O Port
41 I/O Port
42 Authenticating Section
43 I/O Port
51 I/O Port
61 I/O Port

The invention claimed is:

1. A communication system which communicates predetermined data between a first electronic device and a second electronic device, wherein
the first electronic device, includes:
a first communication port configured to communicate the predetermined data with the second electronic device via a first communicating connection between the first communication port and the second electronic device;
a second communication port configured to communicate authentication data for an authenticating process with the second electronic device via a second communicating connection between the second communication port and the second electronic device, the second communicating connection being different from the first communicating connection;
a controller configured to control communication of the predetermined data with the second electronic device through the first communication port and the first communicating connection; and
an authentication section external to the controller of the first device and configured to perform the authenticating process with the second electronic device through the second communication port and the second communicating connection, and
the second electronic device, comprising:
a first port configured to communicate the predetermined data via the first connection between the first port of the second electronic device and the first electronic device;
a second port configured to communicate authentication data for the authenticating process via the second connection between the second port of the second electronic device and the first electronic device, the authentication data being different from the data communicated via the first communicating connection;
a controller configured to control communication for the predetermined data with the first electronic device through the first port of the second electronic device and the first communicating connection; and
an authenticating section external to the controller of the second device and configured to perform the authenticating process with the first electronic device through the second port of the second electronic device and the second communicating connection, the controller of the second electronic device initiating the authentication section of the second electronic device based on communication with the first electronic device.

2. The communication system as set forth in claim 1, wherein
the first electronic device further includes:
a third communication port configured to interconnect the controller of the first electronic device and the authentication section of the first electronic device,
wherein when the controller of the first electronic device has informed the second electronic device of an authentication start command through the first communicating connection, the controller of the first electronic device informs the authentication section of the first electronic device of the authentication start command through the third communication port, wherein the second electronic device further comprises:
a third port configured to connect the controller of the second electronic device and the authentication section of the second electronic device, and
wherein when the controller of the second electronic device has received the authentication start command from the first electronic device through the first communicating connection, the controller of the second electronic device informs the authentication section of the second electronic device of the authentication start command through the third connecting section.

3. The communication system according to claim 1, wherein the second communication port of the first electronic device communicates with the second port of the second electronic device via a subset of a plurality of second communicating connections, the subset of the plurality of second communicating connections being chosen at random by one of the first electronic device and the second electronic device.

4. An authenticating method of communicating predetermined data between a first electronic device and a second electronic device, comprising:
connecting a first port of the first electronic device with the second electronic device through a first communicating connection;
communicating the predetermined data with the second electronic device via the first communicating connection;
connecting a second port of the first electronic device with the second electronic device through a second communicating connection;
communicating authentication data for an authenticating process with the second electronic device via the second communicating connection, the second communicating connection being different from the first communicating connection;
controlling, in a microcontroller unit of the first electronic device, communication for the predetermined data with the second electronic device through the first communicating connection;
performing, in an authentication section of the first electronic device, the authenticating process with the second electronic device through the second communicating connection, the authentication section being external to the microcontroller unit of the first electronic device;
connecting a first port of the second electronic device with the first port of the first electronic device via the first communicating connection
communicating the predetermined data between the first port of the second electronic device and the first port of the first electronic device via the first communicating connection;
connecting a second port of the second electronic device with the second port of the first electronic device via the second communicating connection
communicating authentication data for the authenticating process between the second port of the second electronic device and the second port of the first electronic device via the second communicating connection, the authentication data being different from the data communicated via the first communication connection;
controlling, in a microcontroller unit of the second electronic device, communication for the predetermined data with the first electronic device through the first communicating connection;

initializing the authentication section of the second electronic device based on a command from the microcontroller unit of the second electronic device;
performing, in an authentication section of the second electronic device, the authenticating process with the first electronic device through the second communicating connection, the authentication section of the second electronic device being external to the controller of the second electronic device, the authenticating method including:
causing the authentication section of the first electronic device to transmit the authentication data to the authentication section of the second electronic device through the second communicating connection;
causing the authentication section of the second electronic device to reply authentication data in response to the received authentication data to the authentication section of the first electronic device through the second communicating connection; and
causing the authentication section of the first electronic device to determine whether or not the second electronic device is an authorized one based on the replied authentication data.

5. An information processing apparatus which communicates predetermined data with an electronic device attached thereto, the information processing apparatus comprising:
means for connecting a first port of the information processing apparatus to the electronic device via a first communicating connection
first connecting means for communicating the predetermined data with the electronic device via the first communicating connection to the electronic device;
means for connecting a second port of the information processing apparatus to the electronic device via a second communicating connection;
second connecting means for communicating authentication data for an authenticating process with the electronic device via the second communicating connection to the electronic device, the authentication data being different from the data communicated by the first connecting means;
controlling means for controlling communication for the predetermined data with the electronic device through the first connecting means and the first communicating connection; and
authenticating means, separate from the controlling means, for performing the authenticating process with the electronic device through the second connecting means and the second communicating connection, the control means initiating authentication by issuing an authentication command to the electronic device through the first communicating connection and independently of the second communication connection, the authentication means including:
means for transmitting the authentication data to the electronic device through the second communicating connection;
means for receiving authentication data replied from the electronic device in response to the transmitted authentication data through the second communicating connection; and
means for determining whether or not the electronic device is an authorized one based on the received authentication data.

6. The information processing apparatus as set forth in claim 5, further comprising:

third communicating means for connecting the controlling means and the authenticating means,
wherein the controlling means informs the electronic device of an authentication start command through the first connecting means, and
informs the authenticating means of the authentication start command through the third communicating means.

7. The information processing apparatus as set forth in claim 5, further comprising:
third communicating means for connecting the controlling means and the authenticating means,
wherein the controlling means receives an authenticated result from the authenticating means through the third communicating means, and
after the authenticating means has completed the authenticating process, the controlling means informs the electronic device that the authenticating process has been complete.

8. An information processing method for an information processing apparatus comprising:
connecting a first port of the information processing apparatus with an electronic device attached thereto via a first communicating connection;
communicating predetermined data with the electronic device via the first port and the first communicating connection;
connecting a second port of the information processing apparatus with the electronic device via a second communicating connection;
communicating authentication data for an authenticating process with the electronic device via the second port and the second communicating connection, the authentication data being different from the data communicated via the first communicating connection;
controlling, in a microcontroller unit, communication for the predetermined data with the electronic device through the first communicating connection;
initiating authentication, at the microcontroller unit, by issuing an authentication command to the electronic device through the first communicating connection and independently of the second communication connection; and
performing, in an authentication section external to the microcontroller unit, the authenticating process with the electronic device through the second communicating connection, the information processing method including:
causing the authentication section to transmit the authentication data to the electronic device through the second communicating connection;
causing the authentication section to receive authentication data replied from the electronic device in response to the transmitted authentication data through the second communicating connection; and
causing the authentication section to determine whether or not the electronic device is an authorized one based on the received authentication data.

9. A battery which performs an authenticating process with an electronic device attached thereto, the battery, comprising:
a first port configured to communicate predetermined data with the electronic device via a first communicating connection between the first port and the electronic device;
a second port configured to communicate authentication data for the authenticating process with the electronic device via a second communicating connection between the second port and the second electronic device, the second communicating connection being different from the first communicating connection, the authentication data being different from the data communicated by the first port;
a controller configured to control communication of the predetermined data with the electronic device through the first port and the first communicating connection; and
an authentication section external to the controller and configured to perform the authenticating process with the electronic device through the second port and the second communicating connection, the controller initiating the authentication section based on communication with the first electronic device, wherein the authentication process includes
causing the authentication section to transmit the authentication data to the electronic device through the second communicating connection,
causing the authentication section to receive authentication data replied from the electronic device in response to the transmitted authentication data through the second communicating connection, and
causing the authentication section to determine whether or not the electronic device is authorized based on the received authentication data.

10. The battery as set forth in claim 9, further comprising:
a third port configured to connect the controller and the authentication section,
wherein the controller receives an authentication start command from the electronic device through the first port and informs the authentication section of the authentication start command through the third port.

11. The battery as set forth in claim 9, wherein the controller includes:
a detecting section configured to detect at least one of current, voltage, temperature, and remaining capacity of the battery, and
wherein the controller controls communication for a detected result of the detecting section with the electronic device through the first port.

* * * * *